United States Patent [19]

Ichiyanagi

[11] 4,320,518
[45] Mar. 16, 1982

[54] SWITCHING CONTROL SYSTEM

[75] Inventor: Toshikazu Ichiyanagi, Mitaka, Japan

[73] Assignee: Canon Kabushiki Kaisha, Tokyo, Japan

[21] Appl. No.: 105,033

[22] Filed: Dec. 19, 1979

[30] Foreign Application Priority Data

Dec. 28, 1978 [JP] Japan .................... 53-165845

[51] Int. Cl.³ .................................... H04B 1/68
[52] U.S. Cl. .................................... 375/17; 340/782; 340/825.03
[58] Field of Search ............... 340/147 R, 782, 147 C, 340/147 CV; 375/17

[56] References Cited

U.S. PATENT DOCUMENTS

| | | | |
|---|---|---|---|
| 3,398,239 | 8/1968 | Rabow | 375/17 |
| 3,459,892 | 8/1969 | Shagena | 375/17 |
| 3,510,585 | 5/1970 | Stone | 375/17 |
| 3,559,067 | 1/1971 | Genest | 375/17 |
| 3,569,955 | 3/1971 | Maniere | 375/17 |
| 3,587,088 | 6/1971 | Franaszek | 375/17 |
| 3,649,915 | 3/1972 | Mildonian | 375/17 |
| 3,959,791 | 5/1976 | Takahashi | 340/782 |

Primary Examiner—Harold I. Pitts
Attorney, Agent, or Firm—Toren, McGeady & Stanger

[57] ABSTRACT

The present invention relates to a system in accordance with which switching signal produced in the one piece of equipment is transmitted to another piece of equipment through a digital/analog converter. The transmitted analog signal is further converted into a digital signal by means of an analog/digital converter in the above equipment so as to carry out the switching control of the circuits and so on in the equipment by means of the signal converted into digital form. This is done so that the transmission of the switching signal between a plural number of pieces of equipment comparatively close to each other or under the condition where mixture of noise hardly cannot readily take place might be realized by means of a very small number of wires.

4 Claims, 4 Drawing Figures

FIG.4

| OUTPUT | CASE | 1 | 2 | 3 | 4 | 5 | 6 | 7 | 8 |
|---|---|---|---|---|---|---|---|---|---|
| SWITCH | 2 | OFF | ON | OFF | ON | OFF | ON | OFF | ON |
|  | 3 | OFF | OFF | ON | ON | OFF | OFF | ON | ON |
|  | 4 | OFF | OFF | OFF | OFF | ON | ON | ON | ON |
| COMPARATOR | 12 | L | L | L | L | H | H | H | H |
|  | 13 | L | L | H | H | L | L | H | H |
|  | 14 | L | H | L | H | L | H | L | H |
| OPERATIONAL AMPLIFIER | 23 | 0V | 0.2 V | 0.4 V | 0.6 V | 0.8 V | 1.0 V | 1.2 V | 1.4 V |
| COMPARATOR | 15' | L | H | H | H | H | H | H | H |
|  | 16' | L | L | H | H | H | H | H | H |
|  | 17' | L | L | L | H | H | H | H | H |
|  | 18' | L | L | L | L | H | H | H | H |
|  | 19' | L | L | L | L | L | H | H | H |
|  | 20' | L | L | L | L | L | L | H | H |
|  | 21' | L | L | L | L | L | L | L | H |
| SWITCHING ELEMENT | 8' | OFF | ON | OFF | ON | OFF | ON | OFF | ON |
|  | 9' | OFF | OFF | ON | ON | OFF | OFF | ON | ON |
|  | 10' | OFF | OFF | OFF | OFF | ON | ON | ON | ON |

SWITCHING CONTROL SYSTEM

BACKGROUND OF THE INVENTION

The present invention relates to a control system for carrying out the switching control of an electrical circuit in a second piece of equipment by means of a digital signal in a first piece of equipment.

Until now, (n+1) wires or contacts were needed including the ground wire in order to connect equipment A to equipment B when n of the circuit groups in the equipment are changed over or driven by means of a digital signal source of n bits or n switch groups in the equipment A of the two pieces of equipment A and B connected to each other.

On the other hand, along with the increase of the number of wires or number of connectors between the two pieces of equipment it is likely that the manufacturing processes will be increased so as to increase the manufacturing cost while the reliability is decreased, which is not advantageous.

Until now, in order to decrease the number of wires between two pieces of equipment, parallel digital signals are converted into serial signals for example by a time-sharing system and then transmitted.

In this way, it is sufficient to provide such signals on a transmission line excluding the ground wiring, whereby in case of this time sharing system it is necessary to prepare a complicated circuit construction in order to provide necessary timing, while a time delay necessarily takes place because parallel signals are once converted into serial signals and again into parallel signals. Accordingly some problem often takes place when the number of the bits of the digital signal to be transferred is increased.

The present invention has been made in consideration of the above mentioned background.

SUMMARY OF THE INVENTION

An object of the present invention is to provide a system in accordance to which the transmission of the switching signals between a plural number of pieces of equipment can be carried out by means of a single transmission line or contact with a simple circuit construction.

Another object of the present invention is to provide a system in accordance with which the transmission of the switching signals between a plural number of the equipments which are, for example, mountable on each other can be carried out by means of a single transmission line or contacts with a small transmission time delay.

A further object of the present invention is to provide a system in accordance with which by decreasing the number of the contacts for transmitting the switching signals between a plural number of pieces of equipment, the switching of a plural number of the circuits in the individual equipment can mutually and remarkably easily be controlled by means of the switches in other pieces of equipment or digital signals from other pieces of equipment. This is done in such a manner that the electrical functions of the plural number of the equipments are mutually and more closely connected.

A still further object of the present invention is to provide an integrated circuit for signal conversion by means of which the number of the transmission wires of the switching signals between a plural number of pieces of equipment are positioned comparatively close to each other.

In order to fulfil the above mentioned objects in accordance with the present invention, when a system in accordance with which at least one equipment is provided with a digital signal source consisting, for example, of switch groups, while the other equipment is provided with a plural number of circuits and so on connected in such a manner that the switching of the circuits is controlled by means of the digital signal source, the former equipment is provided with a digital-/analog converter, while the latter equipment is provided with an analog/digital converter. Accordingly, the outputs of the digital signal source are transmitted so as to be supplied to the analog/digital converter through the digital/analog converter in order to control the switching of the above plural number of circuits and so on.

Consequently, despite that the fact that the construction is remarkably simple, the number of the electrical wires or electrical contacts between the plural number of the pieces of equipment can be made one, while there takes place no delay in the signal transmission time.

As explained above the present invention is considerably effective for the transmission of switching signals between a plural number of pieces of equipment positioned comparatively close to each other or under the condition where the noise mixture is very small.

BRIEF DESCRIPTION OF THE DRAWINGS

FIG. 4 shows the operation modes of the parts of the first embodiment.

DESCRIPTION OF THE PREFERRED EMBODIMENT

Figure 1:
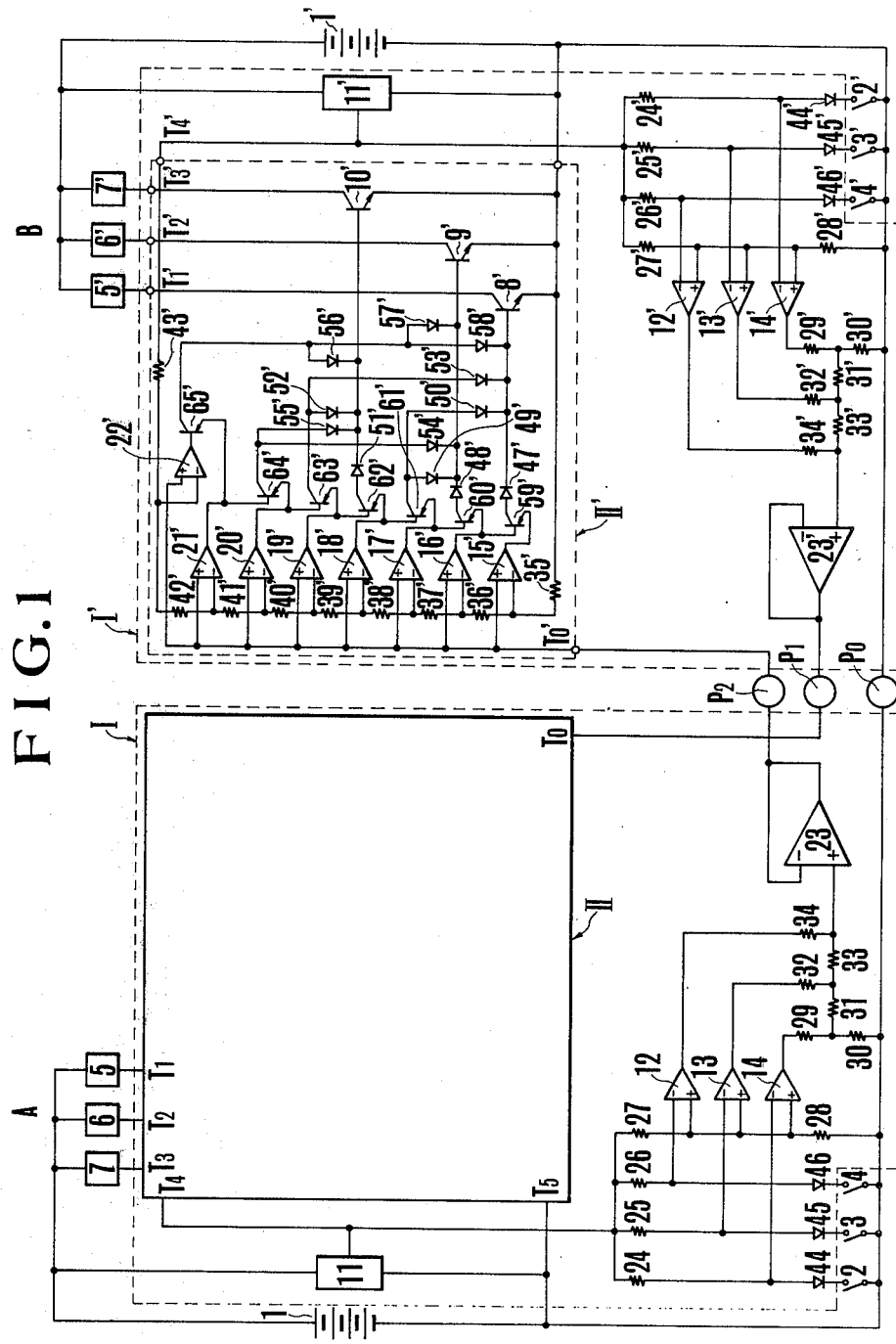
FIG. 1 shows the electrical circuit of the first embodiment of the present invention.

In FIG. 1, the equipments A and B respectively present a switching control device having electrically identical construction.

The equipments A and B are respectively provided with three electrical circuits to be switched In the drawing, 1 and 1' are respectively a power source, 2 and 2' are respectively a switch for controling the conductivity of the electrical circuit 5, 5', 3 and 3' are respectively a switch for controling the conductivity of the electrical circuit 6, 6', and 4 and 4' are respectively a switch for controling the conductivity of the electrical circuit 7, 7'.

I and I' are respectively the first circuit block of the same construction when circuit integration is included in the construction.

II and II' are circuit blocks for the sake of the explanation of the circuit, constituting an analog/digital converter. T0–T5 and T'0–T'5 are respectively the input and the output terminals corresponding to each other.

Elements 8', 9' and 10' are respectively a npn type switching transistor for controlling the conductivity of the circuit 5', 6' and 7'.

11 and 11' are respectively a constant voltage source, for example producing 1.6 volt in the present embodiment. Elements 12-14 and 15'-22' are respectively a comparator, element 23 is an operational amplifier acting as voltage follower, and elements 24-34 and 35'-43' are resistances, whereby the ratio of the resistances 31 and 33 to those 24, 30, 32 and 34 is set to be 1:2. Elements 44-46 are non-return diodes while elements 47'-58' are diodes constituting OR gates.

Elements 59'-65' are pnp transistors acting as gate elements, while P0-P2 are connector contacts.

Further, the figures with ' represent the elements constituting elements of the equipment B, while the figures without ' represent the elements for the equipment A, whereby the elements having the same figures have the same functions and are wired in the same way.

The constant voltage source 11' is connected in parallel with the power source 1', whereby the constant voltage output is grounded through the series voltage-dividing resistance groups 43'-35'. The voltages-divided by the voltage dividing resistances 35' and 36', 36' and 37', 37' and 38', 38' and 39', 39' and 40', 40' and 41', 41' and 42' and 42' and 43' are respectively delivered to the inverting input terminals of the comparators 15'-22', while the outputs of the comparators 15'-21' are respectively connected to the emitters of the gate transistors 59'-65'.

The outputs of the comparator 16'-22' are respectively connected to the base of the gate transistors 59'-65'. The collector outputs of the transistors 59', 61', 63' and 65' are connected to the base of the transistor 8' respectively through the diodes 47', 50', 53' and 58'. The collector outputs of the transistors 60', 61', 64' and 65' are connected to the base of the transistor 9' respectively through the diodes 48', 49', 54' and 57'. The collector outputs of the transistors 62', 63', 64' and 65' are connected to the base of the transistor 10' respectively through the diodes 51', 52', 55' and 56'.

The output of the afore mentioned constant voltage source 11' is connected to the anodes of the diodes 44'-46' through the resistances 24'-26', while the cathodes of the diodes are connected to the ground through the switches 2'-4'. The anodes of the diodes 44'-46' are connected to the respective inverting input terminals of the comparators 12'-14'.

Further, the output of the constant voltage source 11' is grounded through the resistances 27' and 28', while the connecting point of the resistances 27' and 28' is connected to the non-inverting input terminals of the comparators 12'-14'. The output of the comparator 14' is grounded through the resistances 29' and 30', while the connecting point of the resistances 29' and 30' is connected to the non-inverting input of the operational amplifier 23' through the resistances 31' and 33'. The output of the comparator 13' is connected to the connecting point of the resistances 31' and 33' through the resistance 32', while the output of the comparator 12' is connected to the non-inverting input of the operational amplifier 23' through the resistance 34'. The output terminal of the operational amplifier 23' is connected to the inverting input terminal so as to constitute a voltage follower as a whole.

The output of the operational amplifier 23 is connected to the input terminal T0 of the circuit block II of the equipment A through the connector contact P1.

Further, the blocks II and II' have the same construction so that the explanation will be made with T replaced with T'. The input delivered to T' is connected to the non-inverting input terminals of the comparators 15'-22'.

The construction being as mentioned above, the operation of the circuit shown in FIG. 1 is as is given in the FIG. 4. Namely, the parallel outputs of the switch groups in the equipment A are equivalent to a 3 bit digital signal, having 8 kinds of output states.

In accordance with the opened or the closed states of the switch groups 2, 3 and 4 as a digital signal source, the comparators 12-14 deliver a 1.6 volt output of the constant voltage source to a circuit net consisting of the resistance groups 29-34 in such a manner that at the outputs of the circuit net, 8 kinds of step voltages from 0 volt up to 1.4 volt with a difference of 0.2 volt between each other appear in accordance with the combination of the switch groups 2-4. The above 8 kinds are given in FIG. 4.

The above step voltages are delivered to the equipment B through the voltage follower 23 and the connector contact P2 and to the respective non-inverting input of the comparators 15'-22' from the position T'0 of the block II'.

On the other hand, the resistances 35'-43' are the voltage dividing resistances, whereby the ratio of the resistances 35', 43' to those 36'-42' is set to be for example 1:2 so that at the respective non-inverting input terminals of the comparators 15'-22' 0.1 V, 0.3 V, 0.5 V, 0.7 V, 0.9 V, 1.1 V, 1.3 V and 1.5 V are applied in sequence in such a manner that these divided voltages are compared with the step input voltages, whereby at the output terminals of the comparators 15'-22' H level signals or L level signals appears. This state is given in FIG. 4. The outputs of the comparator groups 15'-22' are connected to the bases or the emitters of the gate transistors 59'-65', which operate exclusively of each other, whereby their collector outputs are applied to the bases of the switching transistors 8'-10' through the OR gate diode groups 47'-58' so as to control the switching.

When, for example, the threshold levels of the comparators 15'-22' are properly selected and the level of the input from the equipment A is 0.2 V only the level of the output of the comparator 15' is H, while the levels of all of the remaining comparators are L. In this case, the transistor 59' is of npn type and the base emitter circuit is biased in the forward direction so that transistor 59' is brought in the switched on state, whereby the level of the base of the switching transistor 8' is H. The switching transistors 8'-10' are of pnp type and therefore brought into the conductive state when the level of the base is H. Consequently, the above mentioned transistor 8' is brought into the conductive state so as to drive the circuit 5'.

When then the level of the input from the equipment A is 0.4 V, the level of the outputs of the comparators 15' and 16' are H, while the levels of the outputs of the remaining comparators are L. Consequently, the base emitter circuit of the above transistor 59' is biased in the inverted directions so that transistor 59' is brought into the switched off state, while the base emitter circuit of the transistor 60' is biased in the forward direction so that the transistor 60' is brought into the switched on state. Thus, at this time, the switching transistors 8' and 9' are brought into the switched on state so as to drive the circuits 5 and 6.

Further, when the level of the input from the equipment A is 0.6 V, the levels of the outputs of the comparators 15'-17' are H, while the levels of the remaining comparators are L, so that the transistors 59' and 60' are brought into the switched off state while the transistor 61' is brought into the switched on state. In this manner, the output of the transistor 61' is connected to the base of the switching transistors 8' and 9' through the OR gate diode 49' and 50' so that the transistors 8' and 9' are brought into the switched on state. After that, as is shown in FIG. 4, in accordance with the opening and the closing of the switches 2, 3 and 4, in the equipment 4 the circuits 5', 6' and 7' in the equipment B are closed or opened independently from each other.

When hereby as in the case of the present embodiment, the circuit of the digital/analog converter and that of the analog/digital converter are integrated as one module by means of simple incorporation of integrated circuits, three connector contacts are always sufficient even when the circuits in the equipment A and those in the equipment B are driven independently from each other simply by means of the switching signals in the equipments A and B. Further, it goes without saying that the digital/analog converter is not limited to that type made use of in the present embodiment, whereby a digital/analog converter which converts the binary signals of 2 bits into $2^n$ step voltages or currents is sufficient, while an analog/digital converter which converts $2^n$ voltages or currents into binary signals of n bits is sufficient. Further, the switch 2-4 and 2'-4' of the 2 pieces of equipment are just for producing the switching signals, whereby binary signal producing sources are sufficient. Further, in the case of the present embodiment, each of the pieces of equipment is provided with a constant voltage source in order to reduce the number of the connector contacts down to 3, whereby when the number of the contacts is 4 one constant voltage source can be used by both of the equipment in common.

Figure 2:
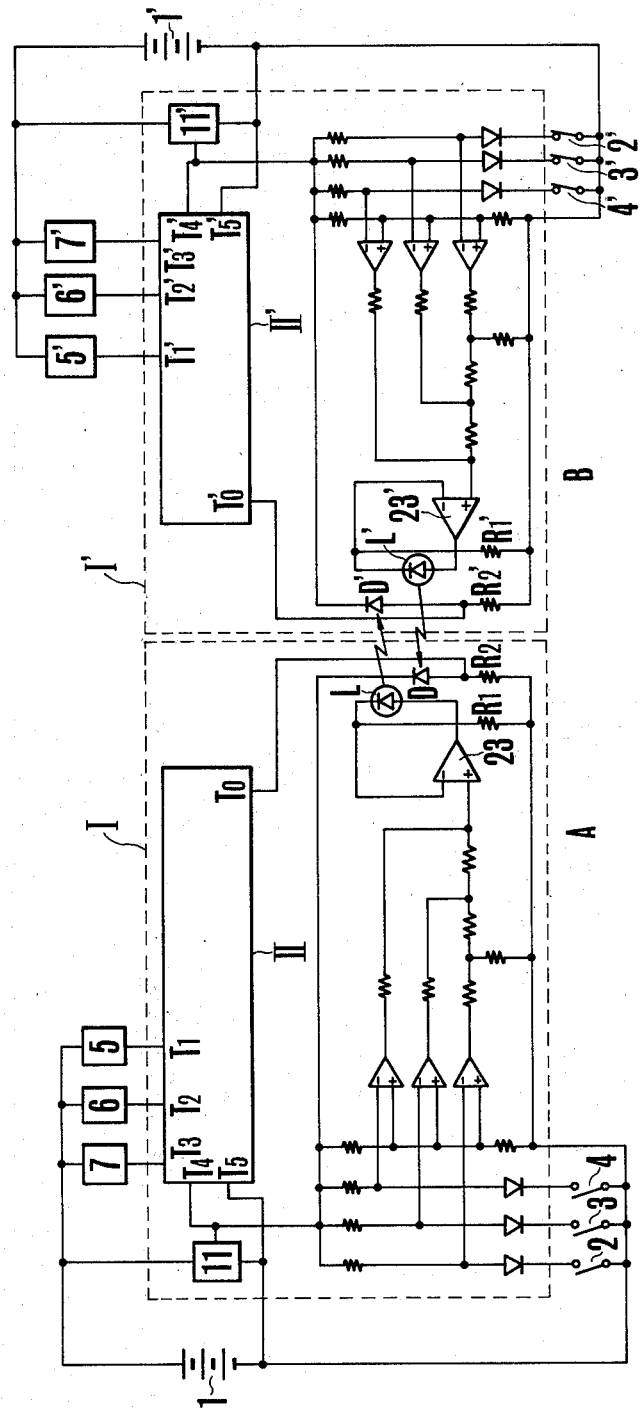
FIG. 2 shows the electrical circuit of the second embodiment, whereby the signal transmission between the two pieces of equipment of the embodiment shown in FIG. 1 is made by means of a light beam.
Figure 3:
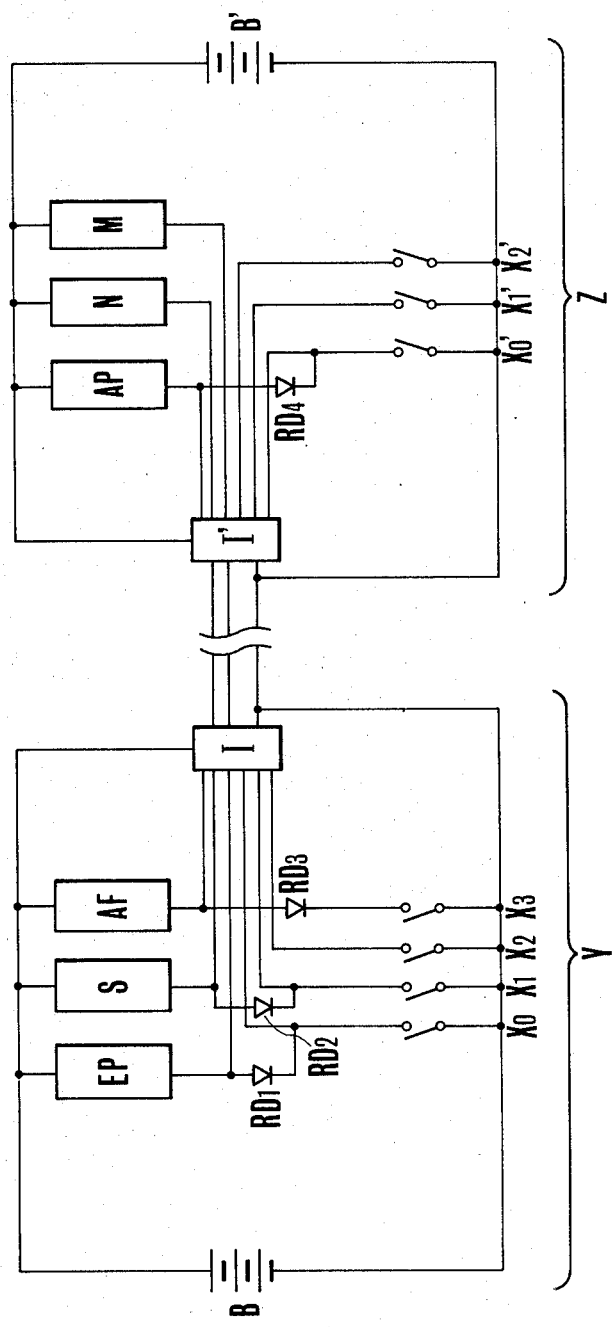
FIG. 3 shows the block diagram of the electrical circuit of the third embodiment, whereby the first embodiment is applied for a camera.

FIG. 2 shows the second embodiment. In the case of the present embodiment, photo couplers are made use of instead of the connectors of the first embodiment. The explanation for the same parts as those of the first embodiment is here omitted.

Elements 23 and 23' are the afore mentioned operational amplifiers for constituting constant voltage circuits. R1, R'1 and R2, R'2 are respectively resistances, L, L' a L.E diode as a light emitting element through which a current proportional to the input of the operational amplifier 23, 23' flows, whereby the emitted light amount varies in accordance with the current and a function. D and D' are respectively a photo diode as a light sensing element, being in the case of the present embodiment so designed that the current amount varies in accordance with the sensed light amount and a function reversed to the above function. Further, the output terminals of the operational amplifiers 23 and 23' are connected to the inverting input terminals through the L.E diodes L, L', while the inverting input terminals are grounded through the resistances R1, R'1. On the other hand, the cathodes of the photo diodes D, D' are connected to the constant voltage sources 11 and 11', while the anodes are respectively connected to the analog input positions T0, T'0 of the analog/digital converter blocks II, II' in the same way as in the case of the first embodiment and further grounded through the resistances R2, R'2. Further, the L.E diodes are so designed that the photo outputs are respectively sensed by means of the photo diodes D', D.

The construction being as mentioned above, the outputs of the operational amplifiers 23, 23' are respectively converted into a light amount by means of the L.E diodes L, L', which light is sensed by means of the photo diode D', D so as to produce a current variation proportional to the inputs of the afore mentioned operational amplifiers 23, 23'. Hereby, it is clear that it is not necessary that the current variation should be linear when the construction of the analog/digital blocks II, II' at the signal receiving side, for example, the comparison input of the comparator is properly set. Then, this current variation is detected as the variation of the potential between the both ends of the resistances R'2, R2 connected in series with the photo diodes D', D and input through the positions T'0, T0 of the analog/digital converter blocks II', II. The operation after that is same as that of the first embodiment so that further explanation will be omitted.

FIG. 4 shows the construction of the third embodiment. The present embodiment relates to the first embodiment applied to a camera. In the drawing, Y is the camera body, 2 is the motor drive device mountable on the camera body, B, B' are the power sources, I, I' are the IC units in the first and the second embodiments, RD1-RD4 are the non-return diodes, E.D is the light measuring circuit, S is the shutter control circuit, AF is the auto focus circuit, AP is the aperture control circuit and M is the motor drive control circuit, whereby N is not made use of especially in this case. Further, X0, X'0 are the switches for driving the light measuring circuit ED and the aperture control circuit AP, X1, X'1 are the switches for driving the shutter circuit and X is the switch for driving the motor drive control circuit, being operatively engaged with the shutter control circuit so as to automatically close and open. X3, X'3 are the switches for driving the auto focus circuit. The construction being as mentioned above, with the first stroke of the shutter release of the camera body, X0 is closed so as to actuate the light measuring circuit. When at this time the motor drive device Z is connected to Y, the aperture control circuit in the motor drive device is operated at the same time.

Then, with the second stroke of the release of the camera body, X3 is closed so as to actuate the auto focus circuit and carry out the automatic focus adjustment.

Further, with the third stroke, X1 is closed so as to actuate the shutter control circuit and carry out the exposure. Further, after the operation of the shutter control circuit, the switch X2 for driving the motor drive device is automatically closed so as to drive the motor drive control circuit in the motor drive device and the film for one picture frame is automatically fed. Hereby, the switch X2 is opened. Namely, the circuits in both of the equipments can be driven by the same operation of the release or the switch provided in the motor drive device. Hereby, the motor drive device is not driven from this side. Further, when the above mentioned motor drive device is taken off, the exposure is controled with the aperture priority method by means of the release of the camera body.

Further, when the present invention is applied when the remote control device is connected to the same equipment beside the case where the present invention is applied for the mutual drive of the two equipments as have been explained in accordance with the first, the second and the third embodiments, the number of the wires or the connector contacts can be reduced by means of a simple construction, which is quite advantageous.

So far, the explanation is made in accordance with the first, the second and the third embodiment.

Below, the advantages of the present invention will be given.

(1) By means of a simple system in accordance with which digital signals are transmitted between the two devices after the signals have once been converted into analog signals, the number of the wires between the pieces of equipment can be considerably reduced, whereby the contact construction of the connectors and so on can remarkably simplified, which increase the reliability.

(2) Also when the circuits and so on in the other piece of equipment are switched on and off by means of the outputs of the switching means in the first piece of equipment, the number of wires can be reduced, which is very effective for remote control and so on.

(3) When the circuits and so on in the other piece of equipment is driven by means of the outputs of the binary signal sources in the other piece of equipment, the number of wires can be remarkably reduced, while when the circuits of a pair of the digital/analog converting means and the analog/digital converting means are integrated, the manufacture or the assembly becomes easy while the applicability is increased.

(4) Further, by means of the fact that the coupling of the two equipments can be made easily as mentioned above, many circuits in each of the piece of equipment can be driven or operated from the other equipment so that organic coupling becomes possible. Thus, it becomes possible to distribute among the individual equipment the circuits which have originally be placed in one position, so that the efficiency of each circuit can be fulfilled largely. For example, although the aperture control circuit of the camera consumes a considerable electrical power, the power consumption can not be without sacrificing the accuracy because the circuit takes most part in the accuracy of the exposure control of the camera, while it is very difficult to realize such a circuit with high accuracy which consumes small power. On the other hand, in accordance with the present invention by incorporating the aperture control circuit in the motor drive device having a large power source, an aperture control circuit with high accuracy can be made use of, while when the motor drive device is not used, for example, in the case of photography with an aperture priority system, the above mentioned efficiency can be separated so that it is not necessary to provide the camera body with a large power source in such a manner that the weight, the cost and the space can be economized.

(5) Further, because the two pieces of equipment can be mutually switched in a very easy way, the multi-step switching can easily be realized by means of a separately provided release even when, for example, the camera holding charges when the camera is provided with a motor drive device.

(6) Because there is practically no time delay in comparison with the conventional time sharing system, the quick and accuate time control becomes possible when, for example, the circuits in a plural number of equipments are switched on and off at the same time.

What is claimed is:

1. A switching control system comprising:
    a digital control signal source, contained in a first piece of equipment, within which source $2^n$ different control patterns are selectively formed, said source having n-pieces of output lines so as to be able to provide as outputs, in parallel, binary signals being independent from each other using each line, wherein binary signals with combinations corresponding to the control patterns formed at the source are provided as outputs in each of said output lines;
    digital/analog converting means, contained in the first piece of equipment, having n-pieces of input lines, each one of which is so connected to each output line of the digital control signal source so as to form a pair respectively, for providing as inputs parallel signals of n-bits from the digital control signal source, wherein one analog level signal is selectively provided as an output out of $2^n$ kinds of analog level signals in correspondence to a combination of said input parallel signals of n-bits;
    a single signal transmission path to transmit the analog level signals being output from the digital/analog converting means to a second piece of equipment;
    analog/digital converting means, contained in the second piece of equipment, having one input line and n-pieces of output lines for providing as inputs the analog signals from the digital/analog converting means through the signal transmission path, wherein said converting means provides as outputs, in parallel, binary signals being independent from each other at the n-pieces of output lines in correspondence to the level of the input analog signals, also wherein the combinations of said parallel binary signals correspond one-to-one to said input analog signal level; and
    n-pieces of switching means, contained in the second piece of equipment, being so arranged as to be able to control the operation of a plurality of electrical circuits within the second piece of equipment, wherein said switching means are connected respectively so as to correspond to the output lines of the analog/digital converting means, and to have their switching controlled by the output signals of the analog/digital converting means;
    whereby the binary signals of n-bits from the first piece of equipment are transmitted to the second piece of equipment through one single signal transmission path and the operation of the n-pieces of switching means within said second piece of equipment can be controlled so as to be independent from each other.

2. A switching control system according to claim 1, in which the signal transmission path contains electrical connector means.

3. A switching control system according to claim 2, in which the digital control signal source within the first piece of equipment consists of n-pieces of switch means being connected in parallel.

4. A switching control system according to claim 1, in which the output of the digital/analog converting means is connected to light emission means within the first piece of equipment and the level of the analog output signals of the digital/analog converting means is converted to an amount of light, wherein the second piece of equipment has a photoelectric converting means to receive light from said light emission means and the output of said photo-electric converting means is connected to the input of the analog/digital converting means,
    whereby the signal transmission path is formed between the light emission means and the photo-electric converting means.

* * * * *